Figure 4:
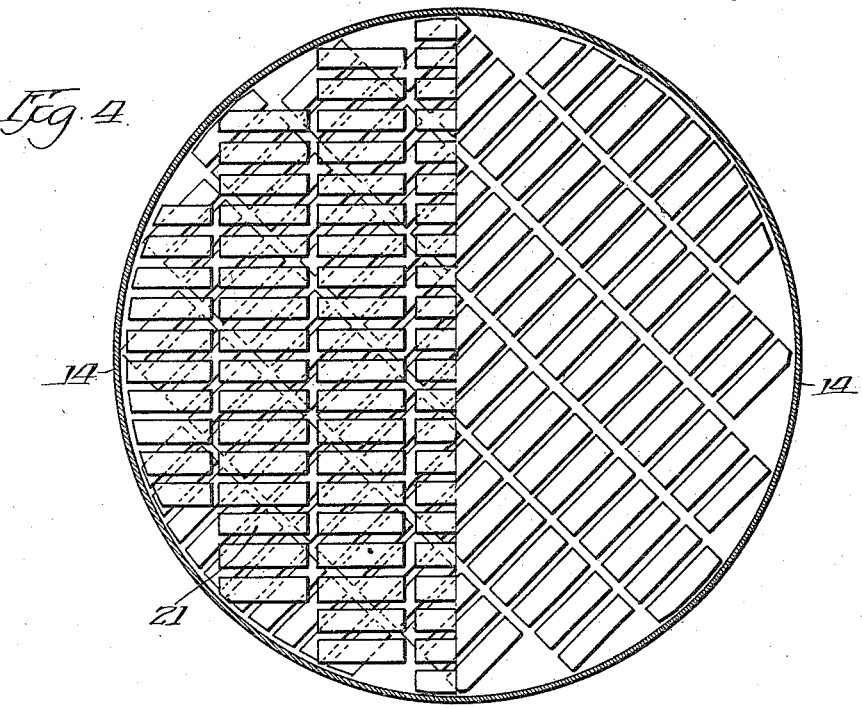

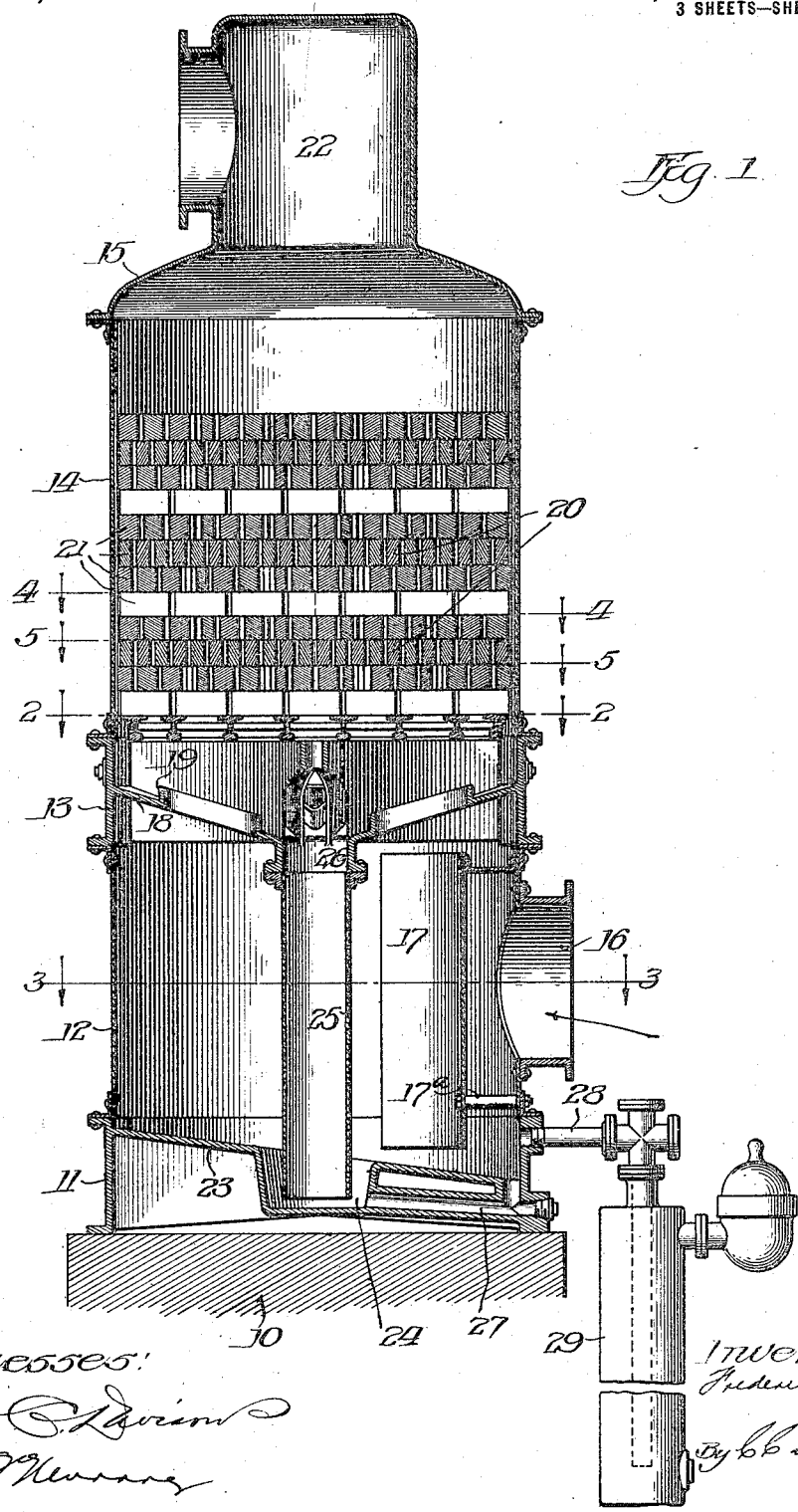

F. TSCHUDY.
TAR EXTRACTOR.
APPLICATION FILED OCT. 2, 1914.
1,155,387.
Patented Oct. 5, 1915.
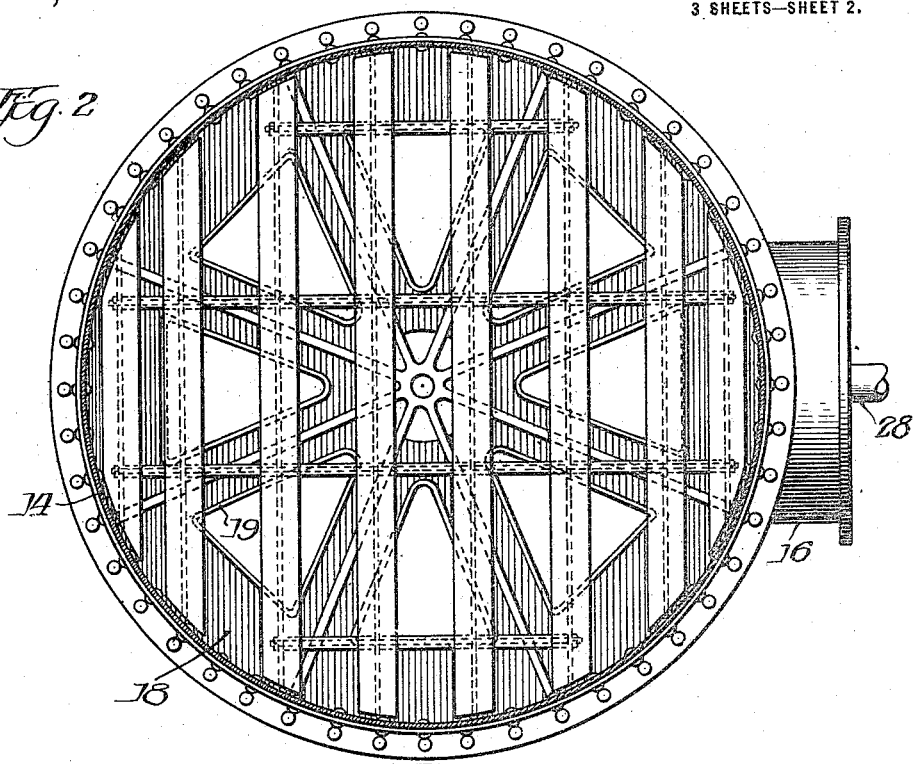
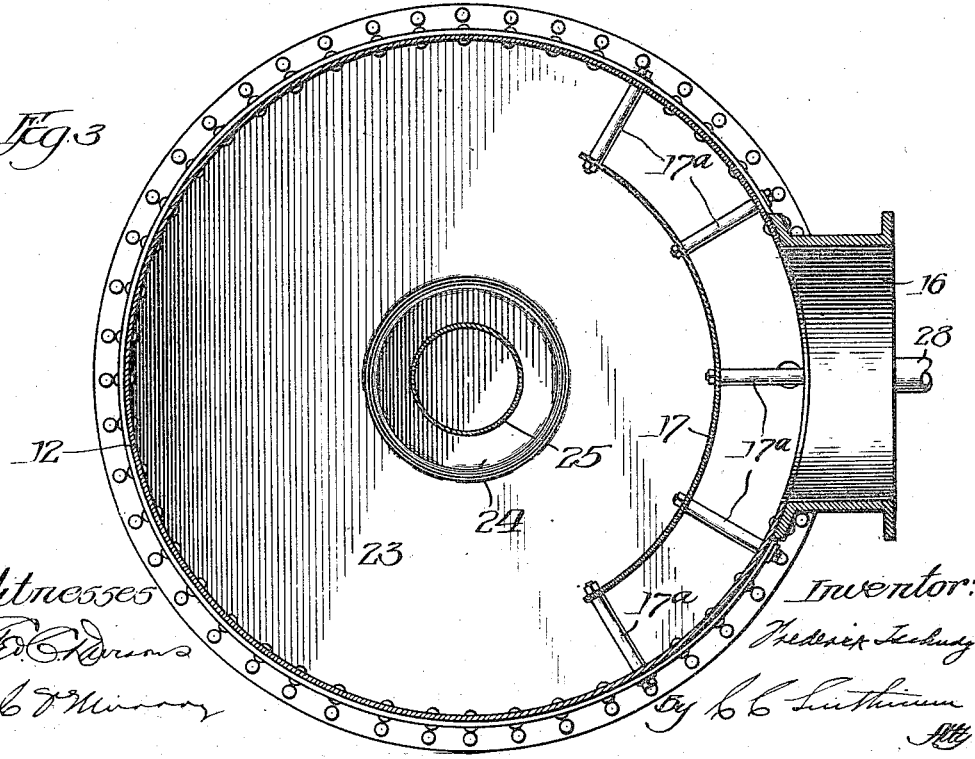

F. TSCHUDY.
TAR EXTRACTOR.
APPLICATION FILED OCT. 2, 1914.

1,155,387.

Patented Oct. 5, 1915.
3 SHEETS—SHEET 3.

UNITED STATES PATENT OFFICE.

FREDERICK TSCHUDY, OF FAIRFIELD, ALABAMA.

TAR-EXTRACTOR.

1,155,387.  Specification of Letters Patent.  Patented Oct. 5, 1915.

Application filed October 2, 1914. Serial No. 864,632.

*To all whom it may concern:*

Be it known that I, FREDERICK TSCHUDY, a citizen of the United States, and resident of Fairfield, in the county of Jefferson and State of Alabama, have invented certain new and useful Improvements in Tar-Extractors, of which the following is a specification.

The invention relates to a new, improved and simplified tar extractor for freeing gases evolved from gaseous fuel after previous cooling from tarry matters carried in suspension and tar fogs, prior to the extraction of sulfate of ammonia by the so-called direct process.

In the process of manufacture of ammonia from gases produced by distillation of fuel such as coal in coke ovens, gas retorts, gas producers and the like, the gas evolved from the fuel charged during the distilling period is usually cooled in order to condense the tar, as well as water, contained therein. This condensation is usually accomplished in air or water coolers, or both, and the temperature of the gas is thus reduced to about 75° to 85° F. At such a temperature practically all the tar contained in the gas, as well as most of the water, will separate from the gas and these by-products are collected in the usual manner, while the gas is passed to the saturators. However, since the gas flows through the apparatus and pipe lines with a considerable velocity, small particles of tar and in particular more costly tarry oils which do not condense at the temperature stated remain in suspension and are carried along with the gas. Eventually, if not properly arrested in their travel, they will reach the saturator where their presence is the cause of trouble in operation and result of contaminated sulfate of ammonium. Many appurtenances are used to intercept this tar fog of which the most important are the so-called tar scrubber for the indirect and the tar extractors for the direct ammonium sulfate process. Washers of various types in which the gas flows counter current to a very fine spray of low temperature tar, actuated by centrifugal force, are used for both processes. Most of the apparatus mentioned necessarily require power for their operation, according to the size and amount of work to be performed, while others depend only on a certain amount of pressure loss in the gas. It is at once evident that whether the power consumption is expressed in horse power or pounds of differential pressure that the energy required to produce this power must be of artificial means, leading back to the boiler plant or source of power. It is therefore evident that the most economical tar extractor is the one in which the power consumption is the lowest possible, combined with the greatest efficiency of tar extraction.

In plants where positive displacement or rotary blowers are used my apparatus is not particularly adapted for use as its design and purpose is in connection with centrifugal or turbo blowers. In the systems using rotary blowers the gas is moved by displacement of positive masses, irrespective of pressure, and the gas therefore does not undergo any changes as to the consistency relative to tarry matters and aqueous vapors. Consequently power must be applied in one form or another to extract the tar by apparatus such as referred to. When centrifugal blowers are used, the gas undergoes a decided change relative to its contents of tarry matter, as well as aqueous vapors. The high peripheral speed of the centrifugal blower has a tendency to eject from the gas by impact a large amount of the heavier particles of tarry matter and water in suspension permitting the gas to travel on with a very fine fog of tar particles of an infinitesimally small size. It has been actually demonstrated that by the use of centrifugal blowers 3% of the total tar production has been extracted by the centrifugal force of the turbo action. The tar fog still remaining in the gas cannot be removed efficiently or economically by any of the apparatus mentioned or now in use, while the tar extractor described below has accomplished the task positively at a loss of ½" water column pressure only, which is about equivalent to the ordinary frictional loss in piping or length through which the gases have to pass in the apparatus to be described.

My invention will be more readily understood by reference to the accompanying drawings, wherein, Figure 1 is a vertical section through a tar extractor constructed in accordance with my invention, and, Figs. 2, 3, 4 and 5 are sections on the lines 2—2, 3—3, 4—4, and 5—5 respectively, of Fig. 1.

Figure 5:
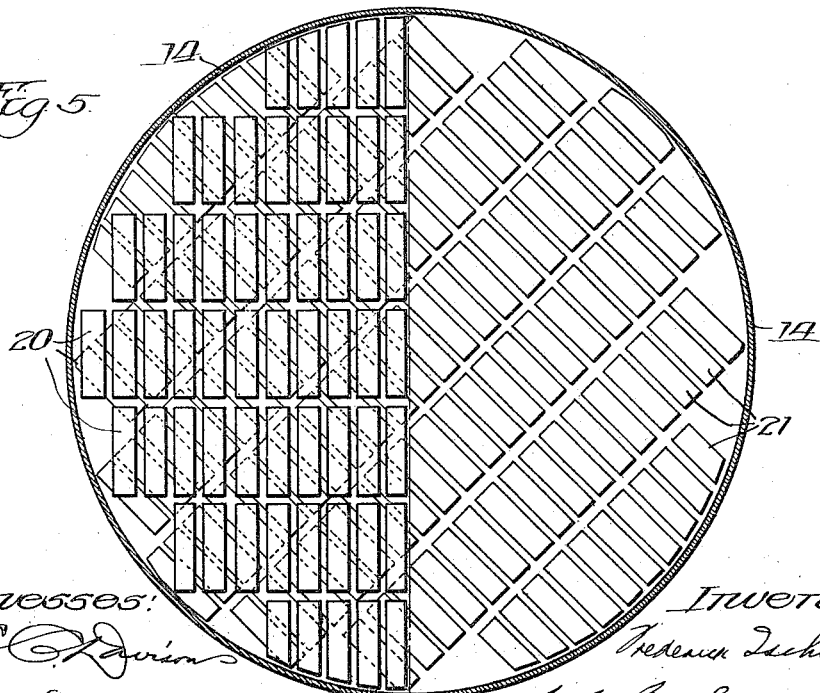

Referring to the drawings it will be seen that I provide a shell of metal supported on a suitable base 10, and consisting of five sections 11, 12, 13, 14, 15. The gases to be treated are adapted to enter through a port 16, formed in the section 12. Immediately upon entering the chamber formed by the section, the gases impinge against an arcuate baffle 17, spaced away from the walls of the section by means of bolts and thimbles 17a, as best shown in Fig. 3. Within the section 13, is a diaphragm 18, provided with apertures therethrough, said apertures being flanged as at 19. Within the section 14, is located checkerwork 20, consisting of bricks, the bricks of each course being laid in parallelism but at an angle of 45° to the bricks of the courses above and below the same. As shown in Figs. 4 and 5, the bricks 21, of each course are spaced apart none of the bricks of a course being in contact with another brick of that course. By this means I provide a multitude of tortuous gas passages through the checkerwork. The shell 14, is surmounted by the section 15, which supports a dome 22, providing an outlet for the treated gases.

The section 11, of the extractor is the seal pot and consists in a casing having an inclined portion 23, with a concentric recess or wall 24, within which the lower end of a tube 25 terminates, this tube being connected with a concentric opening 26, formed as a part of the diaphragm 18. A drain opening 27, is provided for the wall 24. The tar extracted is removed by over-flow through the pipe 28, into a further tar seal pot 29, from which it is removed for use.

The gas entering through the port 16, contacts the baffle 17, and due to the impact and sudden change of direction, a certain amount of the tarry matter is impinged upon this deflector and flows into the section 11. This baffle splits the gas and causes it to take a circling motion along the walls of the distributing chamber 12. From this chamber the gas passes upward through the ports in the diaphragm 18, into and through the tortuous passages in the checkerwork 20. The fine globules of tar in suspension are impinged on the surfaces of the bricks and ultimately form drops of tar which will by gravity action fall onto the diaphragm 18, and are directed down the tube 25, into the collecting section 11. Due to an area many times larger than the inlet nozzle, the gas travels through the extractor at a considerably reduced velocity and permits every particle of the gas to be impinged against the checkerwork and the removal of all tar in suspension. The flanges surrounding the ports in the diaphragm 18, prevent the tar from mingling with the rising gases.

The usual provisions may be made for blowing out the checkerwork by steam. The actual pressure lost in this apparatus when properly designed is less than ¾″ water column or about equal to the pressure loss in two bends of a pipe of the diameter of the inlet nozzle.

I claim:

1. In a tar extractor, the combination of a shell, walls forming a plurality of chambers, including a two-part distributing chamber, a separating chamber, and checkerwork in said separating chamber, said two-part distributing chamber provided, in the lower portion, with a gas port, a vertical arcuate baffle plate disposed near said gas port, said upper portion provided with a diaphragm having flanged apertures therethrough, said flanges extending upwardly, and a tube secured to said diaphragm and extending downwardly through said lower portion of said chamber, substantially as described.

2. In a tar extractor, the combination of a shell, a sealing pot upon which said shell is supported, said shell divided into a plurality of compartments, including a two-part distributing chamber, a separating chamber provided with checkerwork, said seal provided with a central depression, a drain leading therefrom, the lower portion of the distributing chamber provided with a gas inlet port, an arcuate baffle plate vertically disposed in front of said gas port, the upper portion of the distributing chamber having a diaphragm therein, said diaphragm provided with flanged apertures, the flanges extending upwardly and a downwardly-extending tube attached to said diaphragm and adapted to enter said central depression in said seal pot, substantially as described.

FREDERICK TSCHUDY.

Witnesses:
W. G. HARBISON,
M. M. HUGHES.

Copies of this patent may be obtained for five cents each, by addressing the "Commissioner of Patents, Washington, D. C."